United States Patent [19]
Tatsumi et al.

[11] Patent Number: 5,976,651
[45] Date of Patent: Nov. 2, 1999

[54] PROPYLENE PACKAGING LAMINATE COMPRISING METHYLPENTENE RESIN BLEND LAYER

[75] Inventors: Yasuo Tatsumi; Mamoru Yoshimoto; Seigo Akazawa, all of Tokyo, Japan

[73] Assignee: Sumitomo Bakelite Company Limited, Tokyo, Japan

[21] Appl. No.: 08/973,196

[22] PCT Filed: Jun. 28, 1996

[86] PCT No.: PCT/JP96/01793

§ 371 Date: Dec. 3, 1997

§ 102(e) Date: Dec. 3, 1997

[87] PCT Pub. No.: WO97/02141

PCT Pub. Date: Jun. 23, 1997

[30] Foreign Application Priority Data

Jun. 30, 1995 [JP] Japan ................................ 7-166495

[51] Int. Cl.$^6$ ............................ B32B 27/06; B32B 27/32
[52] U.S. Cl. ............................ 428/35.7; 156/244.11; 428/36.7; 428/349; 428/212; 428/220; 428/516
[58] Field of Search ................... 428/516, 35.7, 428/347, 515, 349, 220, 332, 35.9, 212, 354, 36.91; 156/244.11

[56] References Cited

U.S. PATENT DOCUMENTS

| | | |
|---|---|---|
| 4,842,951 | 6/1989 | Yamada et al. ............... 428/516 |
| 4,929,680 | 5/1990 | Matsubara et al. ............ 525/240 |
| 4,988,558 | 1/1991 | Shigemoto ................... 428/213 |
| 5,011,719 | 4/1991 | Gehrke et al. ................ 428/35.7 |
| 5,061,532 | 10/1991 | Yamada ...................... 428/35.7 |
| 5,077,123 | 12/1991 | Shigemoto ................... 428/349 |
| 5,092,469 | 3/1992 | Takata et al. ................ 206/245 |
| 5,151,317 | 9/1992 | Bothe ........................ 428/216 |
| 5,160,767 | 11/1992 | Genske et al. ............... 428/35.98 |
| 5,175,035 | 12/1992 | Pinsolle et al. ............. 428/35.7 |
| 5,178,293 | 1/1993 | Suzuki et al. ............... 220/359 |
| 5,302,442 | 4/1994 | O'Brien et al. .............. 428/213 |
| 5,407,751 | 4/1995 | Genske et al. ............... 428/516 |
| 5,447,792 | 9/1995 | Brandt et al. ............... 428/349 |
| 5,492,757 | 2/1996 | Schuhmann et al. ............ 428/329 |
| 5,500,265 | 3/1996 | Ambrose et al. .............. 428/41 |
| 5,755,081 | 5/1998 | Rivett et al. ............... 53/477 |
| 5,773,136 | 6/1998 | Adler et al. ................ 428/307.3 |
| 5,851,640 | 12/1998 | Schuhmann et al. ............ 428/200 |

FOREIGN PATENT DOCUMENTS

| | | |
|---|---|---|
| 0376681A2 | 7/1990 | European Pat. Off. . |
| 0445955A2 | 9/1991 | European Pat. Off. . |
| 0622411A2 | 11/1994 | European Pat. Off. . |
| 0816428A1 | 1/1998 | European Pat. Off. . |
| JIS K7210 | of 1976 | Japan . |
| JIS K6758 | of 1981 | Japan . |
| 3-146342 | 6/1991 | Japan . |
| 8-230120 | 9/1996 | Japan . |
| 2063278 | 6/1981 | United Kingdom . |

OTHER PUBLICATIONS

Database WPI XP002062119 Sep. 10, 1996.

*Primary Examiner*—Paul Thibodeau
*Assistant Examiner*—Kevin R. Kruer
*Attorney, Agent, or Firm*—Smith, Gambrell & Russell, LLP; Beveridge, DeGrandi, Weilacher & Young Intellectual Property Group

[57] ABSTRACT

A laminate characterized by consisting of at least 4 layers and having (A) a seal layer which is a polypropylene having a melting point of at least 160° C. as the first layer which is the innermost layer, (B) an adjacent layer consisting of a mixture of 20 to 90% by weight of a polypropylene and 80 to 10% by weight of a 4-methylpentene-1 resin as the second layer, (C) an intermediate layer consisting of a polypropylene having a melting point of at least 160° C. and a melt index of 0.5 to 30 as the third layer and (D) a substrate layer consisting of a polypropylene having a melting point of at least 160° C. and a melt index of 0.01 to 4 as the outermost layer, wherein the melt index of the seal layer (A) is at least 1.1 times the melt index of the intermediate layer (C), the melt index of the intermediate layer (C) is greater than the melt index of the substrate layer (D), the interlaminar peel strength between (A) and (B) is weaker than the interlaminar peel strength between (B) and (C), and the interlaminar peel strength between (A) and (B) is 0.2 to 2.5 kg/15 mm (drawing speed: 300 mm/min).

11 Claims, No Drawings

PROPYLENE PACKAGING LAMINATE COMPRISING METHYLPENTENE RESIN BLEND LAYER

TECHNICAL FIELD

This invention relates to a laminate which is used suitably in the packaging field, particularly for the production of a container, and to a easily openable container produced using the same for the accommodation and packaging of foods, chemicals or the like which container is excellent in sealability and openability.

BACKGROUND ART

A plastic container for preserving and distributing foods by sealing them into the container and subjecting them to sterilization treatment at a high temperature is on the increase. Also, in some cases, consumers heat the same by means of a microwave oven in their use, and when the contents contain an oil, the temperature of the contents become high in some cases, so that it has been desired as the consumers' needs that the heat resistance and sealability in the cooking is excellent and, in addition, the openability is excellent. As a container excellent in sealability and easy openability, many proposals have been made for containers in which both sealability and easy openability have been attained by using a multilayer container and using the interface between layers of the multilayer container as an opening peel plane, without effecting the opening at the time of use by peeling the sealed portion which is generally effected (JP-A-50-37,598, JP-B-5-63,385 and JP-B-5-79,587). However, in these containers, the peeling layer is made of PE (polyethylene), and hence, they are disadvantageous in that 120° C. is the upper limit as a high temperature treating condition; that particularly when they are filled with cooked foods containing a large amount of oils, swelling is seen in the peeling layer; that the seal with a lid material is broken because of the softening of the seal layer due to the high temperature; and the like.

For the purpose of overcoming these disadvantages, there is proposed a container having such a layer construction that a polypropylene resin is used as the innermost layer to increase the heat resistance as disclosed in JP-B-7-2,409, whereby the heat resistance has been enhanced as compared with the conventional container having a PE innermost layer. In such a construction, however, PE is still used as an intermediate layer for making peeling possible, and hence, the enhancement of heat resistance to some extent is found but there is such a disadvantage that since in the case of sterilization at a higher temperature (e.g., 130° C.) the intermediate layer is softened and melted, the laminate strength between the intermediate layer and the surface layer is rapidly lowered and peel is caused during the sterilization and therefore the sealability is impaired. In addition, for the overall heat resistance of the container, it is necessary to use a material superior in heat resistance because the use of a usual PP results in a distortion.

The object of this invention is to provide a laminate which is suitably used in the production of an easily openable container in which the heat seal layer and the opening peel layer are made different, and which has heat resistance and oil resistance while keeping easy peelability of the opening peel layer.

DISCLOSURE OF INVENTION

The present inventors have eagerly made a study for achieving the above-mentioned object, and have consequently found that when a laminate to be used in the production of an easily openable container is given a specific layer construction, the above-mentioned problem can be solved, and based on this knowledge this invention has been completed.

That is to say, this invention is a laminate characterized by consisting of at least 4 layers and having (A) a seal layer which is a polypropylene having a melting point of at least 160° C. as the first layer which is the innermost layer, (B) an adjacent layer consisting of a mixture of 20 to 90% by weight of a polypropylene and 80 to 10% by weight of a 4-methylpentene-1 resin as the second layer, (C) an intermediate layer consisting of a polypropylene having a melting point of at least 160° C. and a melt index (JIS K6758) of 0.5 to 30 as the third layer and (D) a substrate layer consisting of a polypropylene having a melting point of at least 160° C. and a melt index of 0.01 to 4 as the outermost layer, wherein the melt index of the seal layer (A) is at least 1.1 times the melt index of the intermediate layer (C), the melt index of the intermediate layer (C) is larger than the melt index of the substrate layer (D), the interlaminar peel strength between (A) and (B) is weaker than the interlaminar peel strength between (B) and (C), and the interlaminar peel strength between (A) and (B) is 0.2 to 2.5 kg/15 mm (drawing speed: 300 mm/min) and wherein, if necessary, the adjacent layer (B) consists of a composition obtained by adding 3 to 20 parts by weight of a polyethylene or an unsaturated carboxylic acid-modified polypropylene to 100 parts by weight of a mixture consisting of 20 to 90% by weight of a polypropylene and 80 to 10% by weight of a 4-methylpentene-1 resin and wherein preferably the thickness of the innermost layer (A) is 5 to 100 μ.

The seal layer (A) of this invention consists of a polypropylene (referred to hereinafter as PP) having a melting point of at least 160° C., and by use of this PP, a laminate having heat resistance and oil resistance can be obtained. Also, it is necessary that the melt index (JIS K6758) of the PP used in (A) be at least 1.1 times the melt index of the PP used in (C). The present inventors have found that the interlaminar peeling from the adjacent layer (B) is controlled by the difference in the melt index (referred to hereinafter as MI) of PP. In other words, it has been found that the interlaminar peel strengths of two layers between which (B) is sandwiched, are affected by MI of PP adjacent to (B), whereby the interlaminar peel strength of the layer having a larger MI becomes smaller. In the case of this invention, it is necessary to cause peel between (A) and (B), and when the MI of (A) is adjusted to at least 1.1 times the MI of (C), the interlaminar peel strength between (A) and (B) becomes smaller than that between (B) and (C) and suitable for easy opening. Moreover, the thickness of (A) is preferably 5 to 100 μ, and when it is less than 5 μ, the seal becomes insufficient. On the contrary, when the thickness is more than 100 μ, there is a fear that the feeling of opening may be impaired. As PP, there may be used any PP as far as its melting point is at least 160° C. and its MI is at least 1.1 times that of (C). Considering the sealability with a lid and the moldability, it is also possible to blend 3 to 20 parts by weight of a polyethylene with 100 parts by weight of PP. Furthermore, in addition to the polyethylene, it is also possible to blend a thermoplastic resin such as an unsaturated carboxylic acid-modified polyolefin, an ethylene-vinyl acetate copolymer or the like to such an extent that the resistance to heat peelability from the adjacent layer is not impaired.

The intermediate layer (C) of this invention aims at maintaining the strength, heat resistance and moldability of the laminate. In this layer, heat resistance is also necessary, and a polypropylene having a melting point of at least 160° C. is used. Moreover, one of the objects of the above intermediate layer is to control the interlaminar peel strength from the adjacent layer (B), and it is necessary that MI be 0.5 to 30. When MI is more than 30, it is difficult to control the interlaminar peel strength between (A) and (B) and the interlaminar peel strength between (B) and (C), and it becomes difficult to make a difference in interlaminar peel strength between the two. In addition, when these conditions are satisfied, it is possible to blend any thermoplastic resin such as polyethylene or the like for the purpose of controlling the moldability and the like.

The substrate layer (D) of this invention is a PP having a melting point of at least 160° C. and this substrate layer (D) occupies a large proportion of thickness of the laminate and affects the moldability and the like, so that it is necessary that MI be adjusted to 0.01 to 4 for enhancing the moldability. When MI is more than 4, the drawdown becomes large in heating for the formation of a laminate and no satisfactory molded article is obtained. Furthermore, when a polypropylene having a melting point of at least 160° C. and a MI of 0.01 to 4 is used, it is also possible to blend any thermoplastic resin such as polyethylene or the like for enhancing the moldability and the like.

The adjacent layer (B) of this invention plays the most important role in this invention, and this layer comprises mainly a blend of a polypropylene and a 4-methylpentene-1 resin. The blending ratio is arbitrary; however, it is preferable that the amount of the polypropylene is 90 to 20% by weight and the amount of the 4-methylpentene-1 resin is 80 to 10% by weight. It is most preferable as the blending ratio that the amount of the polypropylene is 80 to 40% by weight. When the amount of the polypropylene is more than 90% by weight, the opening becomes difficult and, on the contrary, when it is less than 20% by weight, there is a fear that the interlaminar peel strength may become weak and delamination may be caused.

It is also possible to blend a polyethylene for controlling the delicate interlaminar peel strength; however, when the blending amount is too large, the objective heat resistance is impaired in some cases, and as the blending amount, 20 parts by weight is the upper limit per 100 parts by weight of the polypropylene. When the blending amount is small, the interlaminar peel strength cannot be controlled, so that it is desirable that the lower limit is 3 parts by weight. Similarly, for controlling the delicate interlaminar peel strength, an unsaturated carboxylic acid-modified polypropylene is blended in some cases, and as to this blend, it is desirable that the blending amount is not more than 20 parts by weight but not less than 3 parts by weight, because when the blending amount is too large, the peel strength is increased in some cases and when the blending amount is small, the interlaminar peel strength is lost in some cases.

Moreover, in addition to the 4 layers (A) to (D), any resin can be laminated to the outside of the layer (D) or between the layers (C) and (D). The resin to be laminated includes polycarbonate (PC), polyethylene terephthalate (PET), polybutylene terephthalate (PBT), polypropylene (PP), vinylidene chloride resin (PVDC), ethylene-vinyl alcohol copolymer (EVOH), inorganic-filled polypropylene and the like. Furthermore, the layer outside the layer (D) and between the layers (C) and (D) is not limited to a single layer, and a multilayer laminate or the like can be arbitrarily selected. In this case, as the adhesive layer (AD), an unsaturated carboxylic acid-modified polypropylene is preferred. That is to say, as the layer to be added to the outside of the layer (D) or between the layers (C) and (D), PP/AD/EVOH/AD/PP, PP/AD/PVDC/AD/PP and the like can be arbitrarily selected. As others, not only a plastic but also a metal layer such as an aluminum foil, a steel foil or the like can be used. In particular, when it is necessary to improve the oxygen gas-barrier property of the laminate, an ethylene-vinyl alcohol copolymer is used in the form of a laminate outside the layer (D) or between the layers (C) and (D), and as the ethylene polymerization proportion, a proportion of 20 to 50% by weight is arbitrarily used depending upon the purpose. Also, when an ethylene-vinyl alcohol copolymer is used between the layers (C) and (D), in consideration of moldability, the moldability is improved by using the same next to the layer (C) through PP of the same kind as or a different kind from the layer (C). That is, the layer construction is preferably a 8-layer construction of A/B/C/PP/AD/EVOH/AD/D.

The layer construction of this invention can be obtained by coextrusion, lamination-processing or the like using the above-mentioned resins. As the lamination-processing, there can be used any method such as extrusion lamination, coextrusion lamination, dry lamination, thermal lamination or the like.

The most important point of this invention lies in blending a polypropylene with a 4-methylpentene-1 resin as the adjacent layer (B). The melting point of the polypropylene is usually about 150° C. in the case of a random PP or about 160° C. in the case of a homo-PP. On the other hand, the melting point of the 4-methylpentene-1 resin is about 240° C. By blending them, the layer has heat resistance at least 15° C. higher than the conventional intermediate layer comprising mainly a polyethylene, and the intermediate layer neither softens nor melts even when the temperature of the contents becomes high during the sterilization (for example, at least 140° C.). In consideration of, for example, a conventional PE case, the melting point of HDPE (high density polyethylene) which has excellent heat resistance is in the vicinity of 135° C. When the temperature exceeds 120° C., softening proceeds rapidly and the interlaminar peel strength between the seal layer and the intermediate layer, which has been 1.0 to 1.5 kg/15 mm width at not more than 120° C., is rapidly lowered to 0 to 0.2 kg/15 mm once the layers undergo a heat of 125° C. even temporarily. Therefore, in the sterilization at a high temperature of at least 125° C., when such a phenomenon is caused that the lid material is swollen even slightly by the pressure change during the sterilization, it follows that the seal layer and the intermediate layer are easily peeled and it becomes impossible to keep the form as a sealed container. On the other hand, when the intermediate layer according to this invention is used, the container does not take such a form change as mentioned above even when subjected to treatment at a high temperature of at least 130° C. because the intermediate layer per se is excellent in heat resistance, and a stable high temperature treatment becomes possible.

Moreover, in order to increase the overall heat resistance, it is necessary to take into consideration the heat resistance of not only the intermediate layer but also the other layers. The PP used in each of the layers (A), (C) and (D) which are the main layers of this invention has a melting point of at least 160° C. and is excellent in heat resistance. By use of these PP's, the laminate does not exhibit distortion due to heat even when the temperature of the contents has been locally elevated by heating in a microwave oven or the like. Moreover, desirably, a PP having a melting point of at least 160° C. and a high crystallinity is used, whereby the rigidity is further increased and good heat resistance is obtained.

Thus, a further stabilized high temperature treatment becomes possible.

In addition, when a blend of a polypropylene and a 4-methylpentene-1 resin is laminated as the layer (B), easy peelability is exhibited. Its strength is varied depending upon the blending ratio; however, when the mixing ratio is, for example, in the range of 50 to 90% by weight in terms of the polypropylene weight %, the interlaminar bonding strength falls within the easy peel strength range of from 0.5 to 2.5 kg/15 mm. Therefore, the peel of the seal layer can be easily carried out.

The laminate of this invention is molded and used as a container, and sealed with a lid material. However, the opening of the lid must be effected between the layers (A) and (B) and must be easy. Accordingly, the interlaminar peel strength between the layers (A) and (B) must be 0.2 to 2.5 kg/15 mm (drawing speed: 300 mm/min), and furthermore, it is necessary to take into consideration the interlaminar peel strength between the layers (B) and (C) in order to smoothly effect the peel. When the interlaminar peel strength between the layers (B) and (C) is smaller than the interlaminar peel strength between the layers (A) and (B), the interlaminar peel is caused between the layers (B) and (C) in some cases and the opening is not stable. Accordingly, in order to easily effect the opening, it is necessary that the interlaminar peel strength between the layers (A) and (B) be made smaller than the interlaminar peel strength between the layers (B) and (C). Therefore, it becomes necessary to control the strength by varying the MI of PP to be used in (A) and (C). That is to say, the present inventors have found that such requirement is satisfied when the MI of PP in (A) is adjusted to at least 1.1 times the MI of PP in (C).

For this reason, the seal layer of the lid material and the innermost layer (A) must be strongly bonded to each other, and usually, as the material for the seal layer of the lid material, there is used a material of the same quality as or the same material as the material of the innermost layer (A). In order to further improving the easiness of opening, it is preferable that the thickness of the innermost layer (A) falls within the range of from 5 to 100 $\mu$. When the thickness is less than 5 $\mu$, there is a fear that the sealability may be impaired and when it is more than 100 $\mu$, there is a fear that the feeling of opening may be impaired.

BEST MODES FOR CARRYING OUT THE INVENTION

This invention is explained below in detail based on Examples; however, this invention should not be construed to be limited thereto.

Table 1 and Table 3 show the constituting resins and the thicknesses of the layers of the laminates of the Examples and the Comparative Examples, and Table 2 and Table 4 show the interlaminar peel strengths before and after heating between the layers (A) and (B), and the interlaminar peel strengths before and after heating between the layers (B) and (C) of the laminates of the Examples and the Comparative Examples and also the sterilizability, resistance to internal pressure, heat resistance and openability of containers produced using the laminates.

These laminates were produced by a coextrusion method in which each resin is kneaded in and extruded from a different extruder to be led to multiple dies.

The resins used in the Examples and the Comparative Examples are as mentioned below.
PP1: Polypropylene, melting point 163° C., MI=0.5
PP2: Polypropylene, melting point 164° C., MI=2.0
PP3: Polypropylene, melting point 162° C., MI=1.5
PP4: Polypropylene, melting point 165° C., MI=3.0
PP5: Polypropylene, melting point 155° C., MI=2.5
PP6: Polypropylene, melting point 153° C., MI=1.0
PP7: Polypropylene, melting point 165° C., MI=30.0
PP8: Polypropylene, melting point 164° C., MI=20.0
PP9: Polypropylene, melting point 162° C., MI=30.0
AD: Anhydrous carboxylic acid-modified polypropylene
EVOH: Ethylene-vinyl alcohol copolymer
MP: 4-Methylpentene-1 resin
HDPE: High density polyethylene
Modified PP: Carboxylic acid-modified polypropylene Evaluations in the Examples and the Comparative Examples were effected by the following methods:
Interlaminar peel strength before heating:
  The interlaminar peel strengths between the layers (A) and (B) and between the layers (B) and (C) of a laminate were measured.
  Drawing speed: 300 mm/min (180° peeling)
Interlaminar peel strength after heating:
  A laminate was allowed to stand under the 135° C.-dry heat condition for one hour and thereafter, the interlaminar peel strengths between the layers (A) and (B) and between the layers (B) and (C) of the laminate were measured.
  Drawing seep: 300 mm/min
  (180° peeling)
Sterilizability (bag breakage)
  Using the laminates of the Examples and the Comparative Examples, circular containers having an aperture of 65 mm$\phi$, a height of 25 mm and a volume of 70 cc were prepared by vacuum forming. Each of the containers was 90% filled with water and then sealed with a lid film having a thickness of 100 $\mu$m composed of 4 layers consisting of PET/aluminum foil/PET/PP by a heat seal method. Thereafter, 10 samples were sterilized under pressure in hot water of 130° C., and after completion of the sterilization, the water leakage was checked by a visual examination. In Tables 2 and 4, the numerator of a fraction is the number of occurrences of water leakage and the denominator is the total number of samples.
Resistance to internal pressure:
  Into a sample which had been subjected to evaluation of sterilizability and had been free of water leakage, compressed air was injected from the lid material side so as not to leak out and the pressure under which the seal was broken, was measured.
Heat resistance:
  The container used for the sterilizability was 90% filled with a vegetable oil and heated in a microwave oven having an output power of 500 W for 2 minutes. After completion of the heating, the appearance of the container was observed to judge a container exhibiting distortion as bad and a container free from distortion as good.
Openability:
  A container used for the sterilizability was subjected to the same sterilization treatment and thereafter subjected to an opening test by a woman monitor. The cases where the cutting properties of the peel layer during opening were bad, whisker-like shapes were formed and the opening was not smoothly effected, were judged as bad.

TABLE 1

| Example | Layer construction [Lower part: thickness (μm)] | | | | | | | | Seal layer (A) | Adjacent layer (B) | Intermediate layer (C) | Substrate layer (D) |
|---|---|---|---|---|---|---|---|---|---|---|---|---|
| 1 | A/ 50 | B/ 10 | C/ 220 | PP1/ 110 | AD/ 5 | EVOH/ 100 | AD/ 5 | D 300 | PP2 | PP1: 60 MP: 40 | PP3 | PP1 |
| 2 | A/ 10 | B/ 10 | C/ 260 | PP1/ 110 | AD/ 5 | EVOH/ 100 | AD/ 5 | D 300 | PP2 | PP4: 60 MP: 40 | PP3 | PP1 |
| 3 | A/ 90 | B/ 10 | C/ 170 | PP1/ 110 | AD/ 5 | EVOH/ 100 | AD/ 5 | D 300 | PP2 | PP4: 60 MP: 40 | PP3 | PP1 |
| 4 | A/ 50 | B/ 10 | C/ 220 | PP1/ 110 | AD/ 5 | EVOH/ 100 | AD/ 5 | D 300 | PP2 | PP4: 60 MP: 40 | PP1 | PP1 |
| 5 | A/ 50 | B/ 10 | C/ 220 | PP1/ 110 | AD/ 5 | EVOH/ 100 | AD/ 5 | D 300 | PP2 | PP4: 80 MP: 20 | PP3 | PP1 |
| 6 | A/ 50 | B/ 10 | C/ 220 | PP1/ 110 | AD/ 5 | EVOH/ 100 | AD/ 5 | D 300 | PP2 | PP1: 30 MP: 70 | PP3 | PP1 |
| 7 | A/ 50 | B/ 10 | C/ 220 | PP1/ 110 | AD/ 5 | EVOH/ 100 | AD/ 5 | D 300 | PP7 | PP4: 60 MP: 40 | PP8 | PP1 |
| 8 | A/ 50 | B/ 10 | C/ 220 | PP1/ 110 | AD/ 5 | EVOH/ 100 | AD/ 5 | D 300 | PP3 | PP4: 60 MP: 40 | PP6 | PP1 |
| 9 | A/ 50 | B/ 10 | C/ 220 | PP1/ 110 | AD/ 5 | EVOH/ 100 | AD/ 5 | D 300 | PP2 | PP6: 60 MP: 40 | PP3 | PP1 |
| 10 | A/ 50 | B/ 10 | C/ 220 | PP5/ 110 | AD/ 5 | EVOH/ 100 | AD/ 5 | D 300 | PP2 | PP4: 60 MP: 40 | PP3 | PP1 |
| 11 | A/ 50 | B/ 10 | C/ 220 | PP1/ 110 | AD/ 5 | EVOH/ 100 | AD/ 5 | D 300 | PP2 | PP4: 60 MP: 40 | PP3 | PP1: 80 HDPE: 20 |
| 12 | A/ 50 | B/ 10 | C/ 220 | PP1/ 110 | AD/ 5 | EVOH/ 100 | AD/ 5 | D 300 | PP2: 90 HDPE: 10 | PP4: 60 MP: 40 | PP3 | PP1 |
| 13 | A/ 50 | B/ 10 | C/ 220 | PP1/ 110 | AD/ 5 | EVOH/ 100 | AD/ 5 | D 300 | PP2 | PP4: 60 MP: 30 Modified PP: 10 | PP3 | PP1 |
| 14 | A/ 50 | B/ 10 | C/ 220 | PP1/ 110 | AD/ 5 | EVOH/ 100 | AD/ 5 | D 300 | PP2 | PP4: 60 MP: 30 HDPE: 10 | PP3 | PP1 |
| 15 | A/ 50 | B/ 10 | C/ 330 | AD/ 5 | EVOH/ 100 | AD/ 5 | D 300 | | PP2 | PP4: 50 MP: 40 | PP3 | PP1 |

TABLE 2

| Example | Peel strength between (A) and (B) Before heating g/15 mm | Peel strength between (B) and (C) Before heating g/15 mm | Peel strength between (A) and (B) After heating g/15 mm | Peel strength between (B) and (C) After heating g/15 mm | Sterilizability | Resistance to internal pressure kg/cm² | Openability | Heat resistance |
|---|---|---|---|---|---|---|---|---|
| 1 | 1500 | 2000 | 1300 | 1800 | 0/10 | 1.5 | Good | Good |
| 2 | 1500 | 2000 | 1300 | 1800 | 0/10 | 1.3 | Good | Good |
| 3 | 1500 | 2000 | 1300 | 1800 | 0/10 | 2.2 | Good | Good |
| 4 | 1500 | 2300 | 1300 | 2100 | 0/10 | 1.5 | Good | Good |
| 5 | 2300 | 2800 | 2100 | 2600 | 0/10 | 1.8 | Good | Good |
| 6 | 1000 | 1500 | 800 | 1300 | 0/10 | 1.2 | Good | Good |
| 7 | 800 | 1500 | 600 | 1300 | 0/10 | 1.2 | Good | Good |
| 8 | 1600 | 2100 | 1400 | 1800 | 0/10 | 1.6 | Good | Good |
| 9 | 1500 | 2000 | 1300 | 1800 | 0/10 | 1.5 | Good | Good |
| 10 | 1500 | 2000 | 1300 | 1800 | 0/10 | 1.5 | Good | Good |
| 11 | 1500 | 2000 | 1300 | 1800 | 0/10 | 1.5 | Good | Good |
| 12 | 1400 | 2000 | 1200 | 1800 | 0/10 | 1.4 | Good | Good |
| 13 | 1300 | 1800 | 1100 | 1600 | 0/10 | 1.4 | Good | Good |
| 14 | 1400 | 2000 | 1200 | 1800 | 0/10 | 1.4 | Good | Good |
| 15 | 1500 | 2000 | 1300 | 1800 | 0/10 | 1.5 | Good | Good |

TABLE 3

| Comparative Example | Layer construction [Lower part: thickness (μm)] | | | | | | | | Seal layer (A) | Adjacent layer (B) | Intermediate layer (C) | Substrate layer (D) |
|---|---|---|---|---|---|---|---|---|---|---|---|---|
| 1 | A/ 50 | B/ 10 | C/ 220 | PP1/ 110 | AD/ 5 | EVOH/ 100 | AD/ 5 | D 300 | PP5 | PP4: 60 MP: 40 | PP3 | PP1 |
| 2 | A/ 50 | B/ 10 | C/ 220 | PP1/ 110 | AD/ 5 | EVOH/ 100 | AD/ 5 | D 300 | PP2 | PP1: 60 MP: 40 | PP6 | PP1 |
| 3 | A/ 50 | B/ 10 | C/ 220 | PP1/ 110 | AD/ 5 | EVOH/ 100 | AD/ 5 | D 300 | PP2 | PP4: 60 MP: 40 | PP3 | PP6 |

TABLE 3-continued

| Comparative Example | Layer construction [Lower part: thickness (μm)] | | | | | | | | Seal layer (A) | Adjacent layer (B) | Intermediate layer (C) | Substrate layer (D) |
|---|---|---|---|---|---|---|---|---|---|---|---|---|
| 4 | A/ 3 | B/ 10 | C/ 267 | PP1/ 110 | AD/ 5 | EVOH/ 100 | AD/ 5 | D 300 | PP2 | PP4: 60 MP: 40 | PP3 | PP1 |
| 5 | A/ 120 | B/ 10 | C/ 150 | PP1/ 110 | AD/ 5 | EVOH/ 100 | AD/ 5 | D 300 | PP2 | PP4: 60 MP: 40 | PP3 | PP1 |
| 6 | A/ 50 | B/ 10 | C/ 220 | PP1/ 110 | AD/ 5 | EVOH/ 100 | AD/ 5 | D 300 | PP1 | PP4: 60 MP: 40 | PP3 | PP1 |
| 7 | A/ 50 | B/ 10 | C/ 220 | PP1/ 110 | AD/ 5 | EVOH/ 100 | AD/ 5 | D 300 | PP2 | PP4: 95 MP: 5 | PP3 | PP1 |
| 8 | A/ 50 | B/ 10 | C/ 220 | PP1/ 110 | AD/ 5 | EVOH/ 100 | AD/ 5 | D 300 | PP2 | PP4: 10 MP: 90 | PP3 | PP1 |
| 9 | A/ 50 | B/ 10 | C/ 220 | PP1/ 110 | AD/ 5 | EVOH/ 100 | AD/ 5 | D 300 | PP9 | PP4: 60 MP: 40 | PP7 | PP1 |
| 10 | A/ 50 | B/ 10 | C/ 220 | PP1/ 110 | AD/ 5 | EVOH/ 100 | AD/ 5 | D 300 | PP2 | PP4: 60 MP: 40 | PP3 | PP8 |
| 11 | A/ 50 | B/ 10 | C/ 220 | PP1/ 110 | AD/ 5 | EVOH/ 100 | AD/ 5 | D 300 | HDPE | PP4: 60 MP: 40 | PP3 | PP1 |

TABLE 4

| Comparative Example | Peel strength between (A) and (B) Before heating g/15 mm | Peel strength between (B) and (C) Before heating g/15 mm | Peel strength between (A) and (B) After heating g/15 mm | Peel strength between (B) and (C) After heating g/15 mm | Sterilizability | Resistance to internal pressure kg/cm² | Openability | Heat resistance |
|---|---|---|---|---|---|---|---|---|
| 1 | 1300 | 2000 | 1100 | 1800 | 0/10 | 0.5 | Good | Bad |
| 2 | 1500 | 2200 | 1300 | 1900 | 0/10 | 1.5 | Good | Bad |
| 3 | 1500 | 2000 | 1300 | 1800 | 0/10 | 1.5 | Good | Bad |
| 4 | 1500 | 2000 | 1300 | 1800 | 8/10 | 0.2 | Good | Good |
| 5 | 1500 | 2000 | 1300 | 1800 | 0/10 | 2.8 | Bad | Good |
| 6 | 2300 | 2000 | 2100 | 1800 | 0/10 | 1.7 | Bad | Good |
| 7 | 2800 | 3300 | 2600 | 3100 | 0/10 | 2.1 | Bad | Good |
| 8 | 400 | 600 | 200 | 400 | 9/10 | 0.2 | Good | Good |
| 9 | 800 | 700 | 600 | 600 | 0/10 | 1.4 | Bad | Good |
| 10 | 1500 | 2000 | 1300 | 1800 | 0/10 | 1.5 | Good | Bad |
| 11 | 1300 | 2000 | 100 | 1800 | 10/10 | — | — | Bad |

As clear from the above-mentioned results, according to the laminate of this invention there can be stably controlled the easy openability after a high temperature treatment and the sealability. Moreover, an easily openable container obtained from this laminate is excellent in sealability and openability, and its practical value is great.

Industrial Applicability

This invention is a very beneficial laminate which can be utilized in an easily openable container for the accommodation, packaging, preservation and transportation of foods, chemicals and the like, which is excellent in the sealability, openability, preservability of the contents and productivity.

We claim:

1. A laminate comprising at least 4 layers and having (A) a seal layer which is a polypropylene having a melting point of at least 160° C. as the first layer which is the innermost layer, (B) an adjacent layer consisting of a mixture of 20 to 90% by weight of a polypropylene and 80 to 10% by weight of a 4-methylpentene-1 resin as the second layer, (C) an intermediate layer consisting of a polypropylene having a melting point of at least 160° C. and a melt index of 0.5 to 30 as the third layer and (D) a substrate layer consisting of a polypropylene having a melting point of at least 160° C. and a melt index of 0.01 to 4 as the outermost layer, wherein the melt index of the seal layer (A) is at least 1.1 times the melt index of the intermediate layer (C), the interlaminar peel strength between (A) and (B) is weaker than the interlaminar peel strength between (B) and (C), and the interlaminar peel strength between (A) and (B) is 0.2 to 2.5 kg/15 mm.

2. The laminate according to claim 1, wherein the adjacent layer (B) consists of a composition obtained by adding 3 to 20 parts by weight of a polyethylene or an unsaturated carboxylic acid-modified polypropylene to 100 parts by weight of a mixture consisting of 20 to 90% by weight of a polypropylene and 80 to 10% by weight of a 4-methylpentene-1 resin.

3. The laminate according to claim 1 wherein the thickness of the innermost layer (A) is 5 to 100 μ.

4. The laminate according to claim 1 wherein said adjacent layer consists of a mixture of 40 to 80% by weight of a polypropylene.

5. The laminate according to claim 1 which is obtained by coextrusion lamination.

6. The laminate of claim 1 which is obtained by dry lamination.

7. The laminate according to claim 1 which is obtained by thermal lamination.

8. The laminate according to claim 1 wherein the polypropylene of said adjacent layer (B) has a melting point of at least 150° C.

9. A container formed of the laminate according to claim 1.

10. A sealed container formed of the laminate according to claim 1.

11. The method of making the laminate according to claim 1 comprising laminating the layers together or coextruding layers.

* * * * *